United States Patent [19]

Yoshimoto et al.

[11] Patent Number: 4,661,942

[45] Date of Patent: Apr. 28, 1987

[54] CONTROL APPARATUS FOR INFORMATION STORAGE AND RETRIEVAL SYSTEM

[75] Inventors: Kyosuke Yoshimoto; Osamu Ito, both of Hyogo, Japan

[73] Assignee: Mitsubishi Denki Kabushiki Kaisha, Tokyo, Japan

[21] Appl. No.: 643,869

[22] Filed: Aug. 24, 1984

[30] Foreign Application Priority Data

Aug. 26, 1983 [JP] Japan ............................ 58-155875
Sep. 30, 1983 [JP] Japan ............................ 58-182191

[51] Int. Cl.$^4$ .............................................. G11B 7/00
[52] U.S. Cl. .......................................... 369/44; 369/46
[58] Field of Search ................. 250/201 DF; 358/342; 369/43-47; 382/61

[56] References Cited

U.S. PATENT DOCUMENTS 4,555,803  11/1985  Hirose ..................................... 382/61

OTHER PUBLICATIONS

"Tracking Techniques in Pregrooved Optical Disk Technology" by Claude Bricot et al., SPIE vol. 329, Optical Disk Technology (1982), pp. 94-97.

Primary Examiner—Robert L. Richardson
Attorney, Agent, or Firm—Bernard, Rothwell & Brown

[57] ABSTRACT

An information recording and retrieval system, such as an optical system, for recording and reading signals, such as video signals and audio signals, on a recording medium provides improvement in the control of a moving part, such as an objective lens. In a first embodiment, reading of code signals is detected to disable the control of the moving part by the recorded code signals, recorded as discontinuities in a recording track, and to enable control by information signals, recorded as changes in reflectivity in the track, held by a holding circuit so that only recorded information signals operate the control to avoid control distrubances caused by differences in the recorded code and information signals. In another embodiment peak detecting circuits detect the minimum values of split detection signals for controlling the moving part; use of these minimum values for control avoids the control disturbances from the differences in signal reading during recording and reading modes.

8 Claims, 18 Drawing Figures

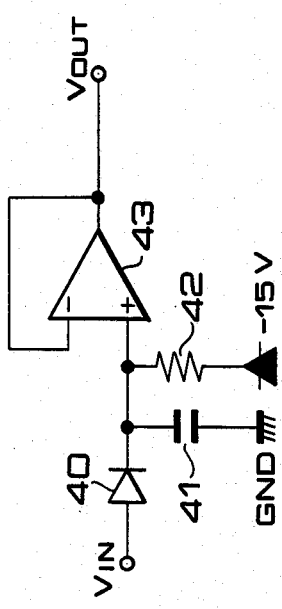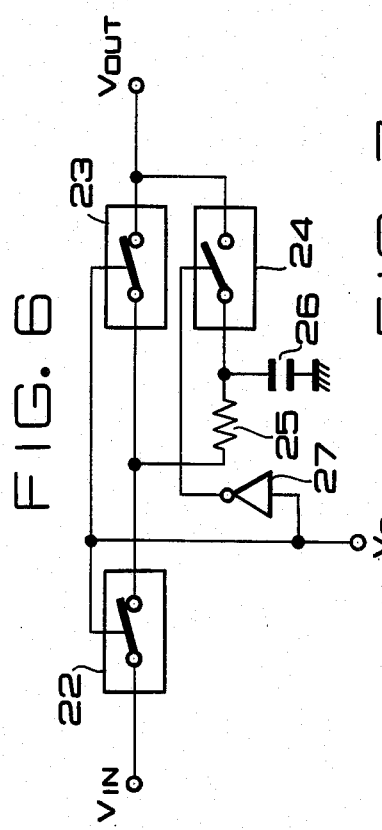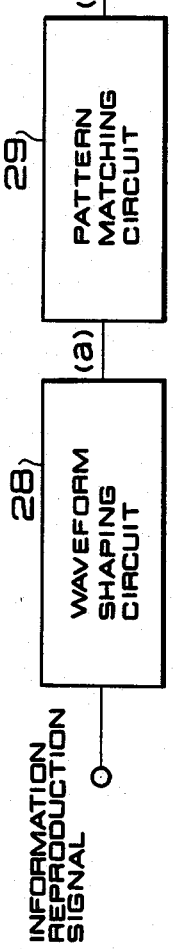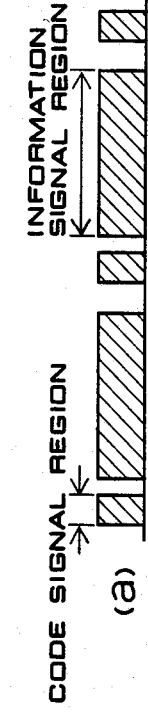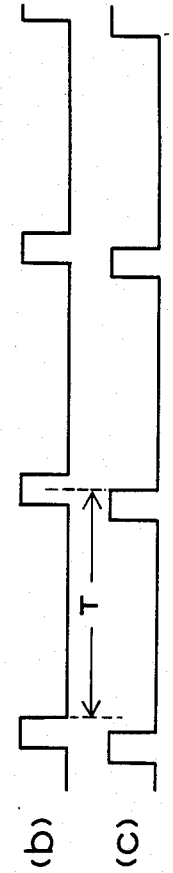

CONTROL APPARATUS FOR INFORMATION STORAGE AND RETRIEVAL SYSTEM

BACKGROUND OF THE INVENTION

1. Field of the Invention

The present invention relates to a control apparatus for an information storage and retrieval system, such as an optical recording and retrieval system, having a signal recording and reading unit for recording and reading signals on a recording medium, wherein a moving part such as an objective lens of the unit is controlled by feedback using signals read from the recording medium.

2. Description of the Prior Art

There has been known such a control apparatus for an information system as disclosed in Japanese Patent No. 1092602, and there has also been proposed an optical disk recording and reproduction system of a tracking servo type, as shown in FIG. 1.

Included in the conventional apparatus shown in FIG. 1 are a light source 1 of, for example, semiconductor laser, a collimator lens 2 for producing a parallel light beam from the light emitted from the light source 1, a prism 3 for unifying the divergence angles in all directions of the beam coming from the light source 1, a condensing objective lens 4 for converging the parallel beam, a disk-type recording medium (will be termed simply "disk") 5, a guide track 6 formed in advance on the surface of the disk 5, a disk drive motor 7 for turning the disk 5, an objective lens drive unit 8, constructed similarly to the voice coil of a loud speaker, for moving the objective lens 4 in a direction substantially perpendicular to the groove of guide track 6 so that a small beam spot produced by the objective lens 4 is kept focused at the center of the guide track 6 on the turning disk 5, a quarter-wave plate 9 for shifting the phase of the beam passing therethrough by $\frac{1}{4}$ wavelength, i.e., a total of $\frac{1}{2}$ wavelength for the return beam, a beam splitter 10 for bending the optical path of the $\frac{1}{2}$ wavelength shifted beam by approximately 90°, a split photo-sensor 11 for transducing the beam coming from the beam splitter 10 into electrical signals, an operational circuit 12 for obtaining the difference of the outputs of the split photo-sensor 11, an amplifier 13 for amplifying the output of the operational circuit 12, a phase compensation circuit 14 for compensating the phase log of the objective lens drive unit 8, a drive circuit 15 for activating the objective lens drive unit 8, an operational circuit 16 for summing the outputs of the split photo-sensor 11, an amplifier 17 for amplifying the output of the operational circuit 16, a division circuit 18 for dividing the output A of the amplifier 13 by the output B of the amplifier 17, and a drive circuit 19 for modulating the light source 1.

In the foregoing arrangement, the light source 1, collimator lens 2, prism 3, objective lens 4, objective lens drive unit 8, quarter-wave plate 9, beam splitter 10, and split photo-sensor 11, in combination, constitute a signal recording and retrieval system for recording and reading signals on the recording medium. The objective lens 4 is a moving part of the system.

The operation of the foregoing conventional apparatus will be described. The light emitted by the light source 1 is formed into a parallel beam by the collimator lens 2, and after having been shaped by the triangular prism 3 it is propagated through the beam splitter 10 to the quarter-wave plate 9. The beam has its phase shifted by $\frac{1}{4}$ wavelength by the quarter-wave plate 9, and it is converged by the objective lens 4 onto the guide track 6 on the disk 5.

In recording information on the disk 5, the drive circuit 19 operates on the light source 1 in response to the information signal to be recorded to increase the energy density of the beam spot in the groove of the guide track 6 sufficient to change the reflectivity of the recording medium in accordance with the information signal. For example, when the binary information signal as shown by (A) in FIG. 2 is to be recorded, the output of the light source 1 is increased in response to the "1"s level of the signal so as to vaporize the recording material of the guide track 6 in that portion thereby to lower significantly its reflectivity in contrast with unaffected portions corresponding to "0"s level of the recording signal.

In the reproducing operation, for example, for the information signal as shown by (A) in FIG. 2 recorded on the guide track 6, the output of the light source 1 is maintained at a level lower than that for recording on the recording medium as mentioned above. The beam reflected on the guide track 6 is collected by the objective lens 4, and after having been further phase shifted by $\frac{1}{4}$ wavelength by the quarter-wave plate 9 it is bent by approximately 90° by the beam splitter 10 and received by the split photo-sensor 11. The guide track 6 has a convex or concave structure of around $\frac{1}{8}$ wavelength relative to its periphery, causing diffraction in the reflected beam, and therefore a displacement of the converged beam spot with respect to the guide track 6 causes anisotropy in the reflected beam. Accordingly, by taking the difference of the outputs of the split photo-sensor 11, the error signal used for the tracking control of the objective lens 4 can be obtained. Furthermore, by taking the sum of the outputs of the split photo-sensor 11, the recording information signal (the output of the amplifier 17 in recording mode) as shown in by (B) in FIG. 2 is obtained for the input information signal as shown by (A) in FIG. 2, and also the reproduced information signal (the output of the amplifier 17 in reproduction mode) as shown by (C) in FIG. 2 is obtained for the same input information signal recorded on the disk 5, provided that recording takes place in such a mode of lowering the reflectivity of the recording material in response to the "1"s input signal level.

The error signal is amplified by the amplifier 13, then divided by the division circuit 18 by the signal amplified by the amplifier 17. The output of the division circuit 18 is the corrective error signal, which is phase compensated by the compensation circuit 14 and fed to the drive circuit 15 for the lens drive unit 8 thereby to control the objective lens 4 on a feedback basis so that the beam spot converged by the objective lens 4 is positioned at the center of the guide track 6. The reason for the use of the output of the division circuit 18 as the input of feedback control of the objective lens 4 is to cancel the variation in the loop gain of tracking servo system due to the variation in the light intensity which amounts 5:1 to 10:1 between recording and reproduction modes, the variation in the reflectivity of the recording medium during reproduction mode and the variation in the transmittance of the optical system.

On the other hand, different from the information signal, the code signal is generally recorded as convexes in the recording medium, and therefore even if the region of the code signal and the region of the information signal have the same amount of incident light, the magnitude of the error signal and reflected light intensity will differ. Furthermore, since the region of the code signal is smaller than that of the information signal and the servo gain is adjusted by making reference to the region of the information signal, the foregoing conventional feedback control apparatus is apt to cause a disturbance of operation, such as overshooting, when the beam spot is located in the region of the code signal. This improper operation will further be explained by taking one example shown in FIG. 3 for the case where the code signal is recorded in advance in the form of concaves with a depth equal to that of the guide track 6 on the disk 5.

Assuming that the disk 5 has a record of information as shown by (A-1) as a disk plan view and (A-2) as a disk cross-sectional view in FIG. 3 (the information signal is recorded in the form of pits on the guide track 6), the operational circuit 16 provides the output as shown by (B) in FIG. 3, which is reduced to the waveform shown by (C) in FIG. 3 due to the frequency response of the amplifier 17 as provided for the purpose of stabilizing the operation. On the other hand, the convex portions (in a sense of relativity) of the code signal and the pit portions of the information signal do not cause anisotropy by interference for the reflected beam, causing the operational circuit 12 to have zero output signal level Vo in principle, but actually an offset is created as shown in the waveform of (D) in FIG. 3. Then, through the same process as for the waveform of (B), the amplifier 13 provides the waveform shown by (E) in FIG. 3. Consequently, the division circuit 18 produces the output as shown by (F) in FIG. 3, creating a disturbance of operation at a transition of beam spot from the code signal to the information signal, and vice versa.

On this account in order to correct the variation in the loop gain and offset caused by the variation of reflected light intensity which amounts about 5:1 to 10:1 between recording and reproduction mode and also the variation of reflectivity of the recording medium which amounts about 1:2 during reproduction mode, the foregoing conventional apparatus needs a division circuit of high reliability. Such an apparatus is not only costly by itself, but also disadvantageous in some cases that the correction through the division operation is not sufficient since the detected signal for the information signal and the error signal are not completely proportional. This matter holds true in the focusing servo system and jitter servo system which have exactly the same arrangement as described above.

A control apparatus for information system such as an information recording and/or reproduction system in which the servo loop gain can be maintained constant without using the division circuit has been proposed by the inventors of the present invention and coinventors, Y. Tamura and I. Watanabe, and is described in Japanese Patent Publication (Japanese Patent Application Laid-open No. 58-32093, filed on Feb. 28, 1983). This information system is arranged such that the outputs of the split photo-sensor are fed to an operational circuit for producing the difference of these outputs and an operational circuit for producing the sum of these outputs, and the error signal provided by the former operational circuit is sampled and held by a sample holding circuit in a region where the waveform of the output of the latter operational circuit after being shaped by a waveform shaper is higher than the preset level, thereby controlling the position of the objective lens on a feedback basis using the error signal provided by the sample holding circuit.

However, this arrangement needs a high-speed sample holding circuit, which is less expensive than a division circuit, but more expensive as compared with the average cost of electronic circuits, and furthermore if the output level of the split photo-sensor is small, the switching noise accompanied by the sample-hold operation can not be ignored.

Generally, the address signal for identifying the information signal and the sensor signal for segmenting a track are recorded on the recording medium in a different or similar way of recording before or during the recording operation of the information signal, and these signals affect the error signal to change the gain, resulting possibly in the unstable control operation. Therefore, this prior art system has problems to be solved before being put into practice.

SUMMARY OF THE INVENTION

In view of the aforementioned prior art deficiencies, the present invention contemplates to enhance the performance of feedback control of the disk tracking servo system by using the corrective error signal which has been obtained in the information signal region as the input of feedback control in dealing with the region of the code signal, and it is an object of this invention to provide an information recording and retrieval apparatus which is inexpensive and yet stable in operation by producing the error signal from the difference of minimum values of a plurality of data obtained in substantially the same portion of the recording medium where the signal level is higher at a position with a record of information signal than a position without the record.

In one form of this invention, the split photosensor provides the outputs to the differential circuit and summing circuit, the outputs of which are fed to the division circuit. The resultant corrective error signal is entered to the sample-holding circuit, which receives the detection signal from the code signal region detection circuit which identifies the code signal region by checking the output of the summing circuit, thereby to obtain the sample of corrective error signal for that region. The drive circuit normally receives the corrective error signal of the information signal region irrespective of the code signal region, in which the sample of the corrective error signal for the previous information signal region is entered, whereby abrupt changes in the control input for positioning the objective lens and also abrupt changes in the loop gain of control system can be prevented.

In another form of this invention, there are provided pre-amplifiers for amplifying the outputs of the split photo-sensor, peak value detection circuits for detecting the peaks of the pre-amplifier outputs, and a differential circuit for providing the difference of the peaks, so that the peak detection circuits detect the minimum values of the pre-amplifier outputs and the differential circuit produces the error signal from the minimum values, and the drive circuit controls the beam spot produced by the objective lens to the center of the guide track, whereby the error signal which is not affected by the recording pit and recording level during the recording operation and is not affected by the recording pit during the reproducing operation can be obtained.

BRIEF DESCRIPTION OF THE DRAWINGS

FIG. 6 is a schematic diagram showing an example of the sample holding circuit used in the apparatus shown in FIG. 4;

FIG. 7 is a block diagram showing an example of the code signal region detection circuit shown in FIG. 4;

FIG. 8, consisting of (A)-(C), is a waveform diagram showing the output signals of the code signal region detection circuit shown in FIG. 7;

FIG. 11 is a schematic diagram of the peak detection circuit used in the apparatus shown in FIG. 9.

DESCRIPTION OF THE PREFERRED EMBODIMENTS

Figure 1:
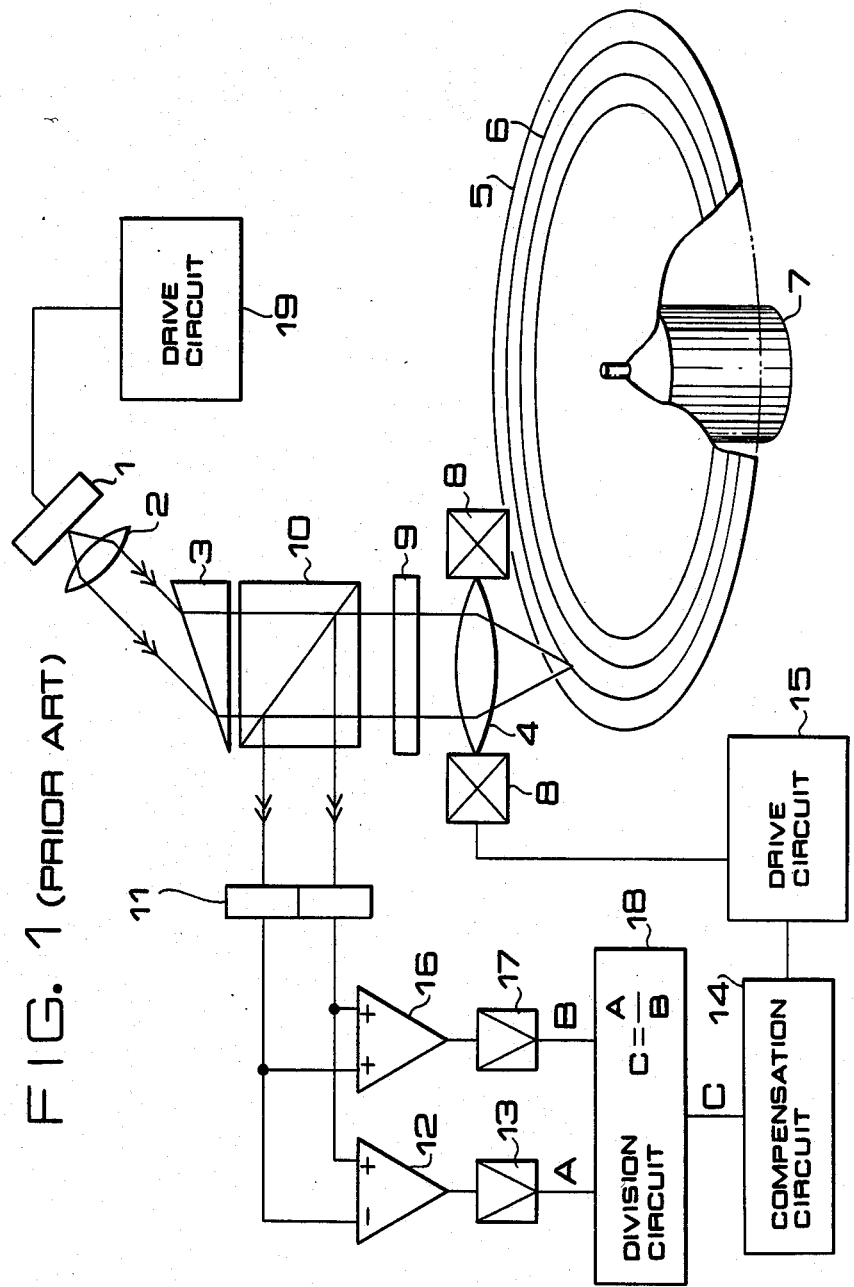
FIG. 1 is a general block diagram showing an example of the conventional apparatus in which the base of the present invention resides.
Figure 2:
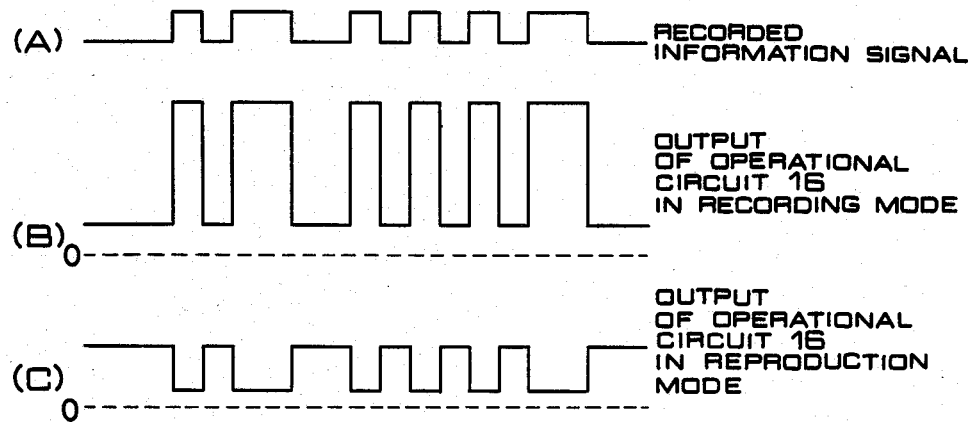
FIG. 2, consisting of (A)-(C), is a set of waveforms used to explain the operation of the system shown in FIG. 1.
Figure 4:
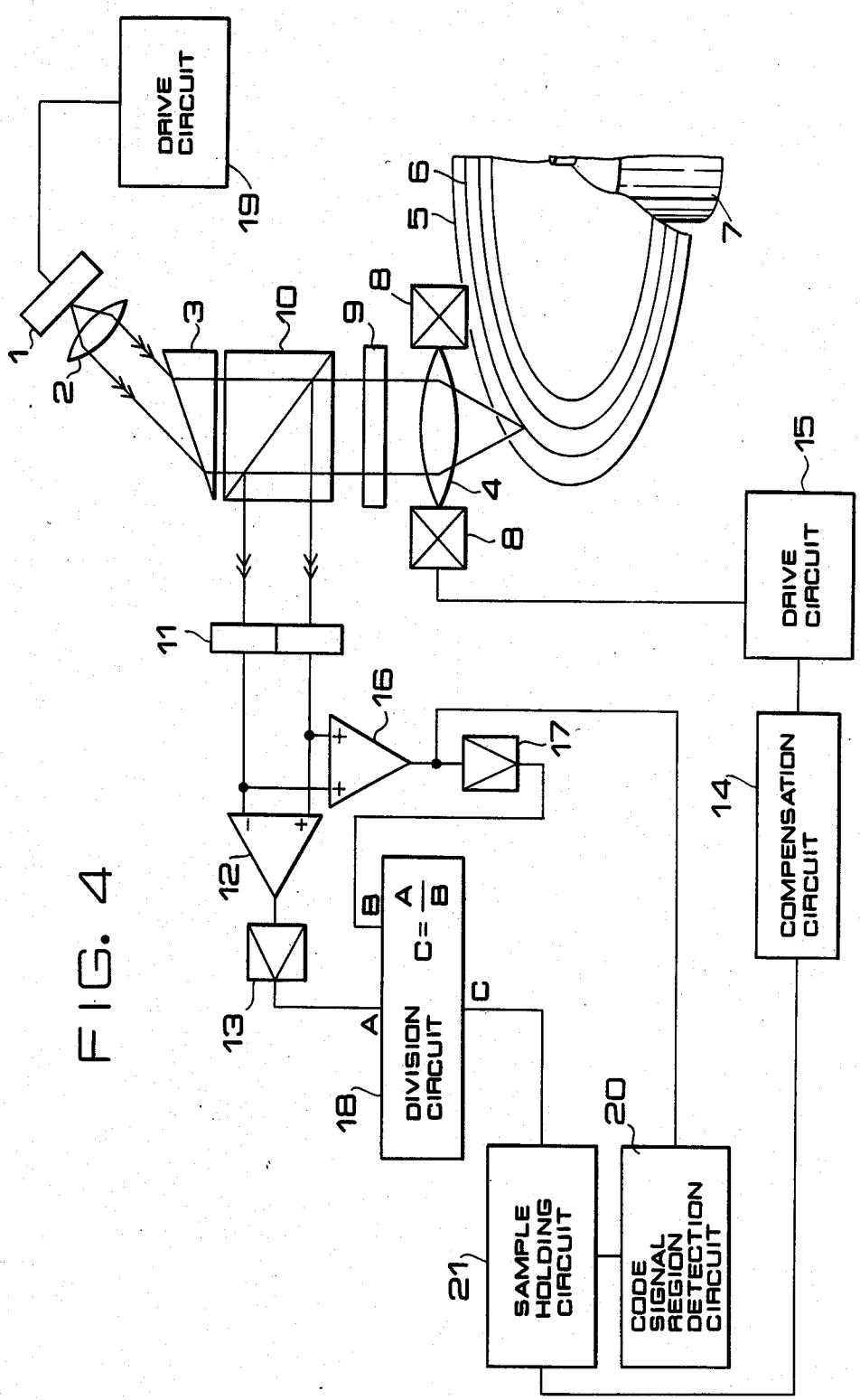
FIG. 4 is a general block diagram showing the control apparatus embodying the present invention.
Figure 5:
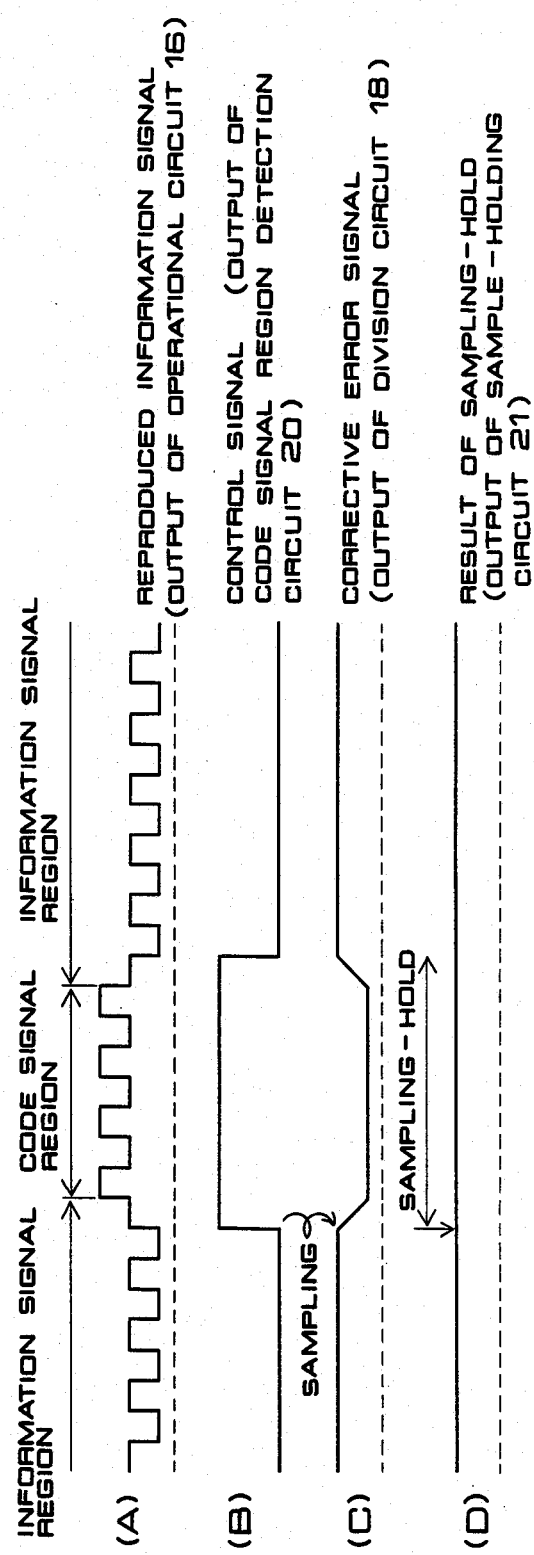
FIG. 5, consisting of (A)-(D), is a set of waveform diagrams used to explain the output waveforms observed in the apparatus of FIG. 4.

An embodiment of the present invention will now be described with reference to FIGS. 4 and 5. System components identical to those of the conventional arrangement shown in FIG. 1 are given the same reference numbers and explanation thereof will be omitted.

Newly included in the system are a code signal region detection circuit 20 which receives the output of the operational circuit 16 for summing the inputs of the split photo-sensor 11 and detects the code signal region; and a sample holding circuit 21 which holds and provides to the compensation circuit 14 the corrective error signal which is the output of the division circuit 18 when the code signal region detection circuit 20 does not detect the code signal region, and the sampled corrective error signal for the information signal immediately before the code signal region when the code signal region detection circuit 20 detects the code signal region.

The operation of the first embodiment constructed as mentioned above will be described. The light from the light source 1 is converged by the objective lens 4 and the reflected beam from the disk 5 is collected by the objective lens 4 and then conducted to the split photo-sensor 11, as in the conventional system. The split photo-sensor 11 provides the outputs to the operational circuits 12 and 16, which produce signals similar to those shown previously [the output of the operational circuit 16 is shown by (A) in FIG. 5], then these signals are amplified by respective amplifiers 13 and 17 to become signals A and B, respectively. The signals A and B are processed through the division circuit 18, resulting in a corrective error signal C (=A/B) with its waveform shown by (C) in FIG. 5, and it is entered to the sample holding circuit 21. The sample holding circuit 21 further receives the output shown by (B) of the code signal region detection circuit 20, and it provides the corrective error signal for the information signal region in the absence of the detection signal, while it provides a sampled corrective error signal for the preceding information signal region in the presence of the detection signal, as shown by (D) in FIG. 5. Accordingly, the drive circuit 15 normally receives the corrective error signal for the information signal region irrespective of the code signal region, and moreover the sampled corrective error signal for the preceding information signal region is used for the code signal region, whereby abrupt changes in the control input for the operation of the objective lens 4 and abrupt changes in the loop gain of control system can be prevented, and the performance of feedback control for positioning the objective lens 4 can be enhanced significantly.

FIG. 6 shows an example of the sample holding circuit 21, and it consists of analog switches 22, 23 and 24 of the active-open type, an integration circuit made up of a resistor 25 and a capacitor 26, and an inverter 27. FIG. 7 shows an example of the code signal region detection circuit 20, and it consists of a waveform shaping circuit 28, a pattern matching circuit 29 and a delay circuit 30.

The code signal includes a specific pattern placed at the top of a series of code signals, and after the reproduced information signal has been shaped by the waveform shaping circuit 28 and converted into digital signal, the pattern is identified by the pattern matching circuit 29 and a signal shown by (b) in FIG. 8 is produced. The delay circuit 30 delays this pulse signal by a time length of T so that it becomes active immediately before the next code signal region, and a control voltage Vc as shown by (c) in FIG. 8 for the sample holding circuit 21 is produced. The sample holding circuit 21 has a control voltage Vc which is low during the sampling period, causing the switches 22 and 23 to be closed and the switch 24 to open, and thus the Vin is sent out directly as the Vout. At the same time, the integration circuit holds a signal of a band needed for the servo system. The integration circuit is made to have a time constant depending on the load of the servo system, and it is set to have a cut-off frequency of, for example, 10 kHz. During the holding period, the control voltage Vc becomes active by going high, causing the switches 22 and 23 to open and the switch 24 to be closed. Accordingly, the Vin immediately before the holding period is held to provide the Vout. The code signal region detection circuit 20 may be arranged such that a code signal region detection groove is provided at an inner section of the disk 5 and the control signal is produced upon detection of this groove.

Figure 10:
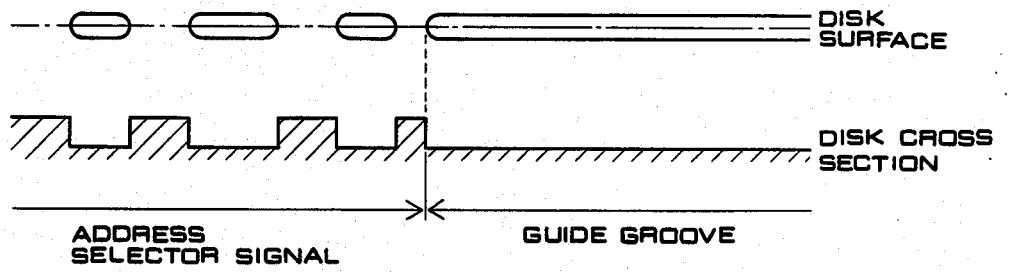
FIG. 10 is a diagram used to explain the recording disk and the output waveform of the apparatus shown in FIG. 9.
Figure 3:
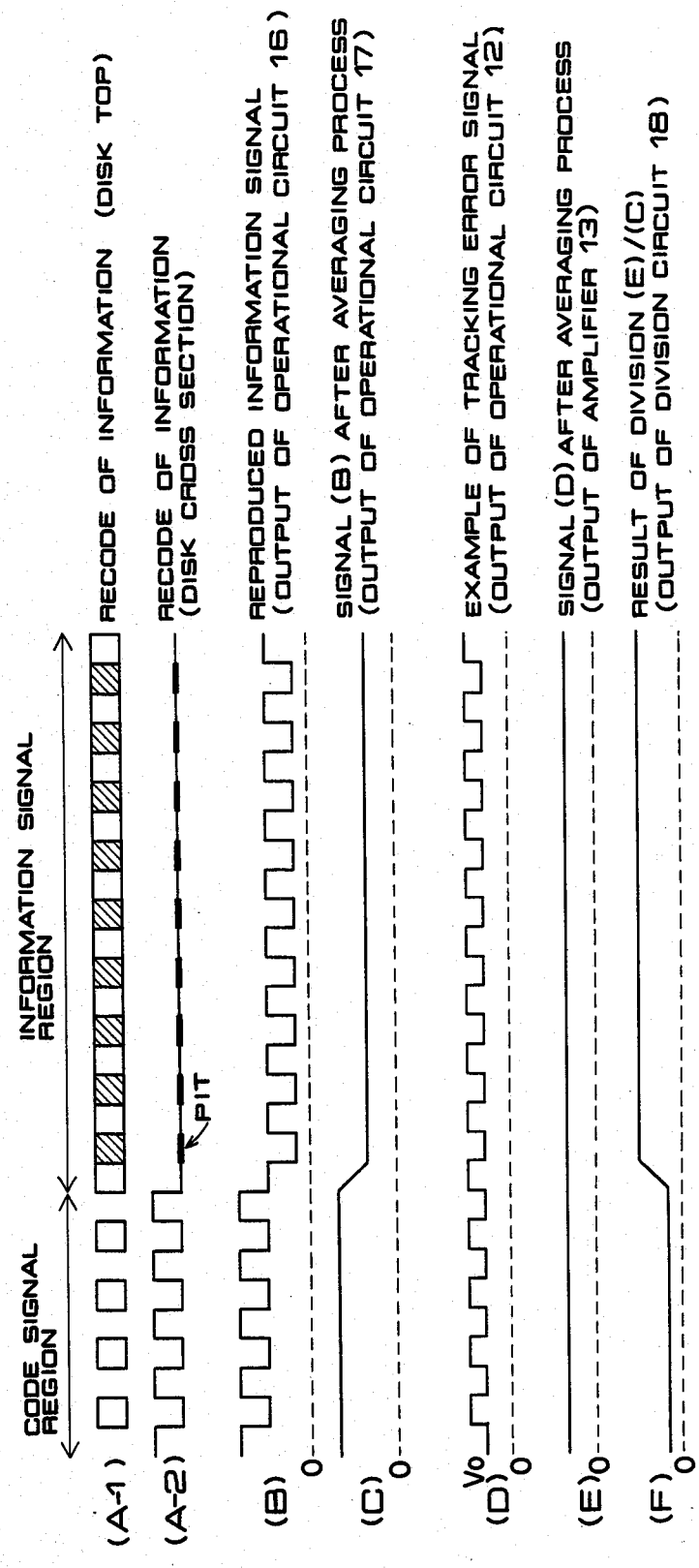
FIG. 3 is a set of waveform diagrams used to explain the output signals produced from the recording medium of the system of FIG. 1.
Figure 9:
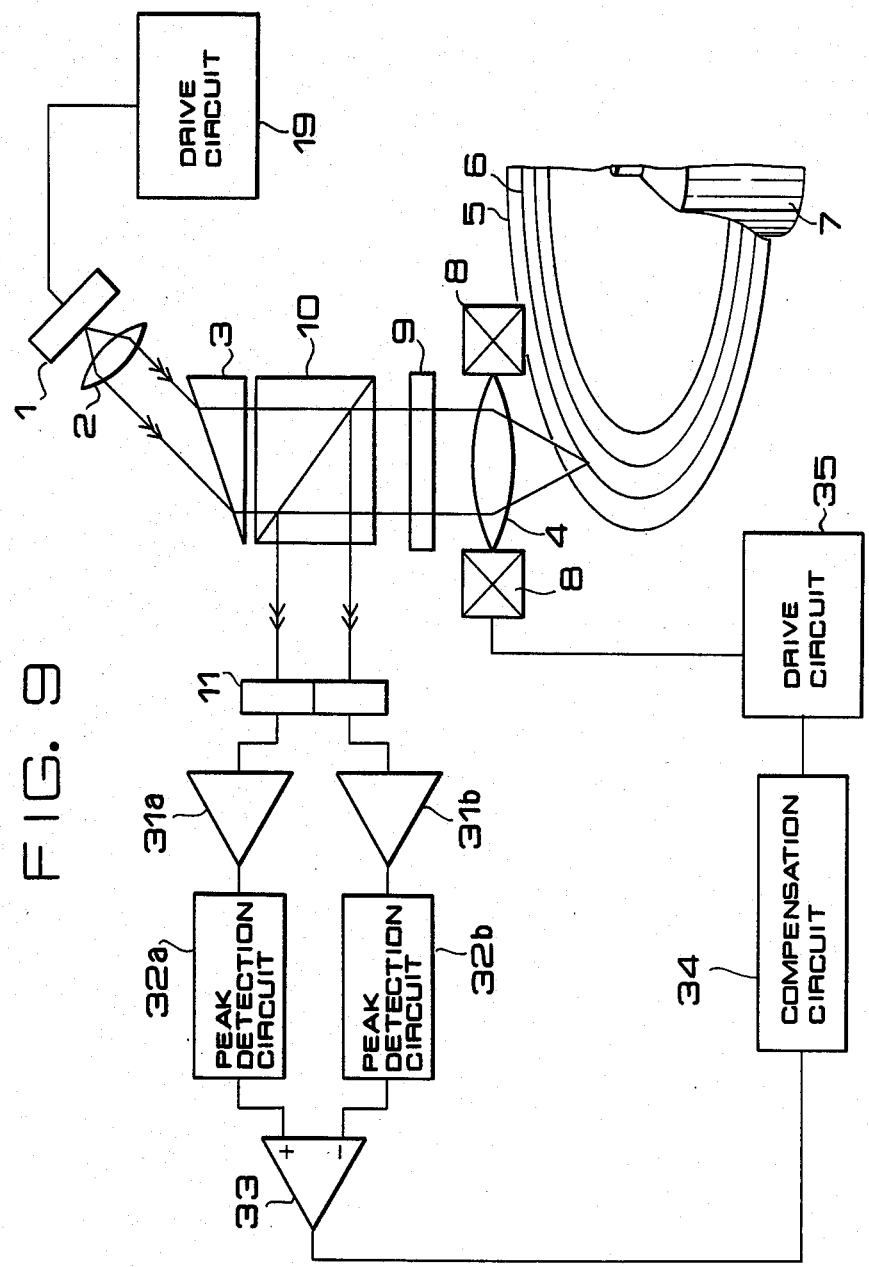
FIG. 9 is a general block diagram showing another embodiment of the present invention.

Next, the second embodiment of the present invention will be described with reference to FIGS. 9 and 10. Like reference numbers in FIGS. 4 and 6 denote like system components, and explanation thereof will be omitted here. Reference numbers 31a and 31b denote pre-amplifiers for amplifying the outputs of the split photo-sensor 11, and they have a frequency band width enough to cover the repetition frequency of recording pits. Reference numbers 32a and 32b denote peak detection circuits for detecting the minimum values of the outputs from the pre-amplifiers 31a and 31b as the peak values for the case of the recording medium with its reflectivity increased by recording, and the circuits have a time constant selected in the middle of the time constant of the servo band and the repetition period of recording pits. Reference number 33 denotes an operational circuit for producing the difference of the peak values from the peak detection circuits 32a and 32b.

The operation of the foregoing arrangement is as follows. The light from the light source 1 is converged by the objective lens 4, and the reflected beam from the recording disk 5 is collected by the objective lens 4, then conducted to the split photo-sensor 11, as in the conventional system. The outputs of the split photosensor 11 are amplified by the pre-amplifiers 31a and 31b. The peak detection circuits 32a and 32b detect the minimum values of the pre-amplifier outputs, i.e., the signal levels when the light source provides the output of reproduction mode and the beam spot is located out of the recording pit, and provides the minimum values to the operational circuit 33. The operational circuit 33 produces the error signal from the detected minimum-level signals, and after having been phase compensated by the compensation circuit 34, it is supplied to the drive circuit 35. The drive circuit 35 operates on the objective lens 4 in response to the input such that the beam spot is held at the center of the guide track 6.

Also in reproduction mode, the light source 1 provides the output at the level for reproduction, and the peak detection circuits 32a and 32b detect the signal levels as the minimum values when the beam spot is located out of the recording pit, as in the above operation, then provide the detected levels to the operational circuit 33. Accordingly, the beam spot produced by the objective lens 4 is controlled to the center of the guide track 6 during the reproducing operation in the same way as of the recording operation described above.

On this account, since the error signal for the feedback positioning control of the objective lens 4 is obtained based on the difference of signal levels at positions out of a recording pit when the light source 1 provides the output of reproduction mode, it is not affected by recording pits and the recording level during the recording operation, and it is not affected by recording pits during the reproducing operation.

FIG. 11 shows an example of the peak detection circuit 32a for detecting the higher peak of the voltage, and it consists of a switching diode 40, a charging capacitor 41, a discharging resistor 42 and a buffer amplifier 43. When the Vin is rising, the diode is conductive, causing the capacitor 41 to charge, and the voltage is outputted through the buffer amplifier 43 as the Vout. When the Vin begins falling, the Vin becomes lower than the voltage charged in the capacitor 41, and the diode 40 is cut off and the peak voltage of Vin is outputted as the Vout. In this case, the Vout would vary only when the Vin rises above the previous peak voltage, and on this account the capacitor is forced to discharge by the discharging resistor 42. The time constant of discharging is determined depending on the frequency of peak detection. For example, the cut-off frequency is chosen to be 30 kHz so that the variation of peak voltage up to 30 kHz can be detected.

For the address selector signal, the error signal can be obtained without being affected by these signals as in the case of the information signal. In case the address selector signal is recorded in advance in the form of concaves with a depth substantially equal to the depth of the guide track 6 on the disk surface as shown in FIG. 10, the concave portion corresponds to the level of the guide track 6 without recording pits, resulting in a lower reproduction level relative to the convex portion, and therefore by detecting the lower level as the peak, the error signal can be obtained without being affected by these signals.

Although in the aforementioned first and second embodiments the tracking servo control for the recording or reproduction system has been described, the present invention can of course be applied to the focusing servo control and time axis servo control for the recording or reproduction system. The signal exchange means for recording and/or reproducing the information signal on the recording disk and for detecting the error signal can be any of the light beam, scanning meter, magnetic head, etc., and the information signal can be any of the video signal, audio signal, facsimile signal, etc., provided that it can be converted into binary signal. The recording medium is not limited to those of disk type, but any recording medium in the form of tape, drum, etc. can be used. The change made in the property of recording material by recording is not limited to reflectivity, but any property such as transmittance, refractive index, shape, etc. which raises the reproduction signal level can be used.

According to the present invention, as described above, the information exchanging apparatus having a signal exchange unit for exchanging signal with a recording medium on which the code signal for identifying the information signal is recorded and with the moving part of the signal exchange unit being controlled on a feedback basis by the corrective error signal based on the scanning data of the signal recorded on the medium, is provided with a code signal region detection means for detecting the code signal region using the signal provided by the signal exchange unit and a hold means which provides the corrective error signal based on the scanning data of the previous information signal for use as the input of feedback control when the detection means detects the code signal region, whereby the corrective error signal of the information signal region can normally be used as the control input for operating the moving part irrespective of the code signal region, and abrupt changes in the control input and abrupt changes in the loop gain can be prevented. Accordingly, the performance of feedback control for the moving part can be enhanced significantly, and more stable recording and reproduction are made possible. Moreover, the error signal is obtained from the difference of the minimum values of a plurality of data obtained at substantially same position of the recording medium, in which the signal level of a portion where the information signal is recorded is higher than that without the record, and the error signal is used for the feedback control of the moving part of the signal exchange unit, whereby the circuit is simplified and made inexpensive and the performance of servo control can be enhanced without being affected by the information signal.

What is claimed is:

1. A control apparatus for an information system comprising a recording medium with a recorded code signal and a recorded information signal identified by the code signal; a signal reading unit having a movable part for reading signals from said recording medium; and control means for moving said movable part by generating and using a corrective error signal derived from characteristics of the signals read from said recording medium by said movable part; said control means including code signal detection means for detecting the code signal in said signals read by said movable part, and holding means operated by said code signal detection means when the code signal is detected for generating the corrective error signal based on a previous read information signal while said code signal detection means is detecting the code signal.

2. A control apparatus for an information system according to claim 1, wherein said control means further comprises a split detector which provides corresponding outputs of characteristics of the signals read from said recording medium by said movable part, and an operational circuit which performs computation on the outputs of said split detector for generating and applying said corrective error signal to said holding means 3. A control apparatus for an information system according to claim 1, wherein said signal reading unit includes means for generating a light beam, and said movable part of said signal reading unit includes an objective lens for converging said light beam onto a predetermined position on said recording medium.

4. A control apparatus for an information system according to claim 1, wherein said code signal detection means comprises a waveform shaping circuit which shapes a signal and converts it into a digital signal; a matching circuit receives the output of said waveform shaping circuit, identifies whether or not said output is the code signal, and generates a predetermined output if said output is found to be the code signal; and a delay circuit which delays the output of said matching circuit and delivers the delayed output to control said holding means.

5. A control apparatus for an information system according to claim 1, wherein said holding circuit comprises switch means for normally passing the corrective error signal from an input to an output of the holding means, an integration circuit connected to said switch means for receiving the corrective error signal and holding the corrective error signal for a predetermined period until said holding means receives a detection signal from said code signal region detection means whereat the switch means disconnects the holding means input from the holding means output and applies an output of the integrating circuit to the output of the holding means.

6. A control apparatus for an information system comprising a recording medium having a recorded information signal with its signal level higher at a recorded portion than that at an unrecorded portion, a signal reading unit having a movable part which reads signals from said recording medium, split peak detection means which detects minimum values of a pair of data signals detected from split portions of the signals read by said movable part from said recording medium, and a control means which includes operation means for receiving the minimum values from said peak detection means and for calculating the difference of the minimum values to generate a correction error signal to move said movable part in accordance with the calculated difference.

7. A control apparatus for an information system according to claim 6, wherein said signal reading unit includes means for generating a light beam, and said movable part of said signal reading unit includes an objective lens for converging said light beam onto a predetermined position on said recording medium.

8. A control apparatus for an information system according to claim 7, including modulating means operating the light generating means for recording the information signal on said recording medium by increasing the energy density of said light beam to a recording level sufficient to change the reflectivity of said recording medium, and for reading the recorded information by decreasing the energy density of said light beam below said recording level.

* * * * *